United States Patent [19]

Wijntjes et al.

[11] Patent Number: 4,672,618
[45] Date of Patent: Jun. 9, 1987

[54] LASER STABILIZATION SERVO SYSTEM

[75] Inventors: Geert Wijntjes, Belmont; Michael Hercher, Marblehead, both of Mass.

[73] Assignee: Beckman Instruments, Inc., Fullerton, Calif.

[21] Appl. No.: 884,872

[22] Filed: Jul. 9, 1986

Related U.S. Application Data

[63] Continuation of Ser. No. 472,538, Mar. 5, 1983.

[51] Int. Cl.$^4$ .............................................. H01S 3/13
[52] U.S. Cl. ...................................... 372/32; 372/37; 372/20; 372/34
[58] Field of Search ...................... 372/20, 37, 94, 32, 372/96, 34, 94, 99, 101

[56] References Cited

U.S. PATENT DOCUMENTS

| | | | |
|---|---|---|---|
| 3,534,292 | 10/1970 | Cutler | 372/32 |
| 3,649,930 | 3/1972 | LeFloch | 372/32 |
| 3,711,786 | 1/1973 | Vautier et al. | 372/32 |
| 4,284,964 | 8/1981 | Maier, Jr. | 372/32 |
| 4,293,223 | 10/1981 | Seaton | 378/98 |
| 4,398,293 | 8/1983 | Hall et al. | 372/32 |
| 4,468,773 | 8/1984 | Seaton | 372/32 |

OTHER PUBLICATIONS

Morris et al; "Frequency Stabilization of Internal Mirror He-Ne Lasers in a Transverse Magnetic Field"; Appl. Opt., vol. 19, No. 12, Dec. 1975, p. 2808.

Primary Examiner—Léon Scott, Jr.
Attorney, Agent, or Firm—William H. May; Paul R. Harder; Steven R. Markl

[57] ABSTRACT

A method and means for stabilizing the difference in frequencies between the frequency components of a two frequency laser beam influenced by Zeeman effect frequency splitting, accurately determines the frequency separation independently of the individual frequencies or intensities of either of the frequency components. Frequency stabilization is accomplished by mechanical and thermal adjustments to the lasing chamber length of the laser by a closed loop servo control referencing the frequency difference between laser beam components and a reference signal having a frequency equal to the desired frequency difference.

9 Claims, 4 Drawing Figures

LASER STABILIZATION SERVO SYSTEM

This is a continuation of application Ser. No. 472,538, filed Mar. 5, 1983.

TECHNICAL FIELD

The technical field to which this invention pertains is the field of lasers influenced by a magnetic field to obtain a Zeeman effect in the output laser beam and, in particular, to stabilization controls for stabilizing the frequency components of the laser beam.

BACKGROUND ART

A short discussion of fundamentals is beneficial to an understanding of the prior art. A gas laser generates a monochromatic light beam having a very narrow frequency bandwidth. Thus, the exact wavelength of the light may be accurately determined. The frequency of a generated laser beam will fall somewhere within a finite gain profile of the spectral line bandwidth of the lasing material, which is defined by the gas species and the nature of the spectral broadening mechanism (e.g., Doppler broadening, pressure broadening, etc.)

Figure 1:
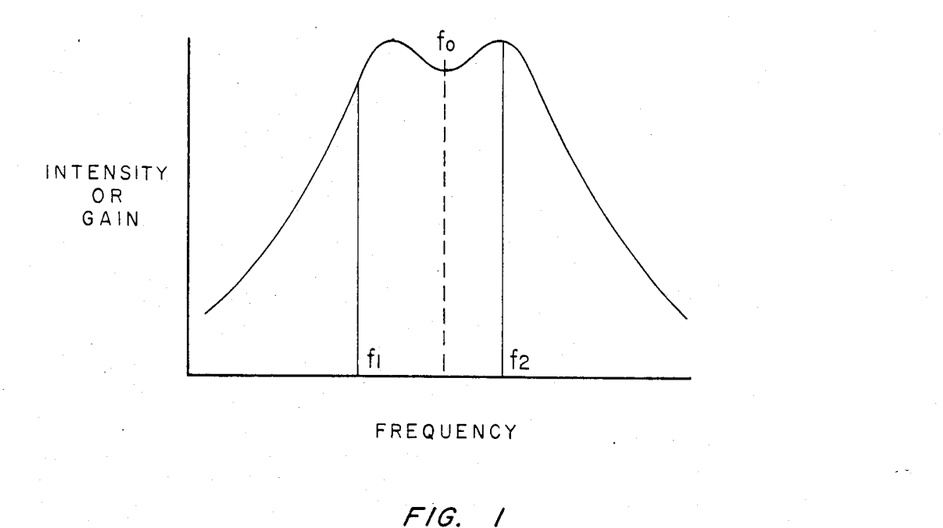
FIG. 1 is a graph depicting a frequency vs. intensity plot indicated the Doppler expanded spectral profile of a light beam generated by a gas laser.

A Doppler broadened profile of the 633 nm laser transition in helium-neon is graphically shown in FIG. 1, with light frequency plotted relative to intensity for a light beam emitted from an excited He—Ne lasing material. The bell-shaped curve indicates the range of frequencies within which laser emission can be obtained. The frequency of the He—Ne laser beam will fall somewhere within this spectral bandwidth, as indicated by the line $F_1$, though the exact position depends critically on the instantaneous length of the laser resonating chamber. The Doppler profile of the He—Ne spectral line typically has a width of 1500 MHz, though the instantaneous bandwidth of generated laser beam bandwidth, as indicated, is very narrow. The resultant laser beam frequency may thus vary by approximately one in $10^6$, which allows a very large range of corresponding light wavelengths, unless a means is applied to control the frequency of the laser beam.

The frequency of the laser beam can be controlled by modulating the distance between the reflecting surfaces at the ends of the lasing chamber. This is normally accomplished by changing the length of the chamber through electro-strictive and/or thermal length varying elements. Prior art has taught the use of a piezoelectric element mounted into or on the outside of the tubular wall of the lasing chamber, which constricts when control voltage is applied to provide immediate changes in cavity length. Heating elements or coils have been applied to the exterior of the tubular wall of the chamber to induce thermally actuated changes in length which, though slower in reaction, provide a greater range of adjustment.

Through use of these techniques, the narrow bandwidth frequency of the laser beam may be positioned, or tuned, to a desired value within the spectral profile and stabilized at a desired frequency for a long period of time.

Figure 2:
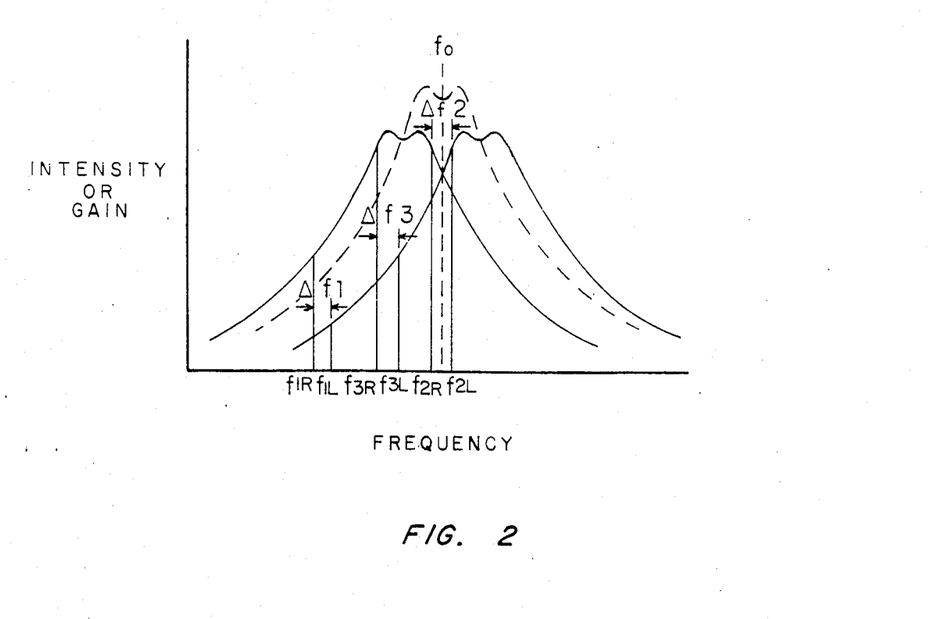
FIG. 2 is a graph depicting the splitting of spectral profiles in a gas laser affected by a magnetic field and specific locations possible for component modes in an output laser beam.

When a gas laser is subjected to an axial magnetic field circular birefringence induced in the active lasing material by the magnetic field produces the Zeeman effect. This results in the formation of two individual component modes in the laser beam having opposing right and left circular polarizations, and differing slightly in frequency. The frequency difference between the component modes is represented as $\Delta f$ in FIG. 2, which difference may vary in the order of 100 to 1500 KHz depending upon the strength of the magnetic field applied. A pair of component modes are indicated in FIG. 2 as $F_{1R}$ and $F_{1L}$, which display a difference in frequency of $\Delta f_1$. The Zeeman effect results in a split of the spectral line profile into two components, indicated by the shifted "Doppler" profiles to the right and left of the original profile (indicated in dotted line). Each of the component modes of the laser beam are likely to have a different light intensity, depending upon their position within the expanded spectral profile. This is indicated in FIG. 2 by the component $F_{1R}$ having a greater intensity than the component $F_{1L}$.

The value of $\Delta f_1$ depends on magnetic field strength and on the location of the mean frequency within the "Doppler" profile.

The difference in frequency $\Delta f$ reaches a minimum as the component modes becomes symmetrically positioned about the line center of the original spectral profile ($f_0$). Minimizing the frequency difference $\Delta f$ between component modes provides means of indicating the laser is operating instability.

When the component modes of the laser beam are heterodyned, the resultant wave is representative of the difference in frequencies $\Delta f$ between the component modes by exhibiting a characteristic beat. Heterodyning obtains a resultant signal having a characteristic beat which corresponds to the difference in the frequencies of the mixed waves. The resultant beat signal has a first frequency which is the average of the frequencies of the mixed waves, and has an amplitude which oscillates in magnitude or beats with time at a much slower second frequency. The second frequency or number of beats occurring per second is equal to the difference in frequencies of the combined waves as described above. This is often referred to as the Zeeman beat signal of the component modes. The frequency difference between component modes can be easily determined by digitally processing the beat count per unit time of the Zeeman beat signal. Thus the Zeeman beat signal provides a clear indication of frequency difference between component modes, which can be used to control the frequency stability of the magnetically influenced laser.

These properties and phenomena of lasers influenced by a magnetic field have been taught by a number of published studies.

A laser permits the use of a direct measurement method of interferometry in which the light wavelength of the laser beam serves as a standard unit of length for the measurement. The laser is advantageous due to a characteristic narrow frequency bandwidth, sharp focus and high intensity of its output light beam, which provides an identifiable and accurately measurable light wavelength. The use of a laser in interferometry permits accuracy in length measurement to within fractions of a micron and permits simplistic digital processing techniques to perform such measurement.

For measurements of length by an interferometric technique, in which the wavelength of the laser beam is used as a standard unit of measure, it is necessary to stabilize the laser frequency at a particular predictable and constant value in the Doppler expanded spectral profile with high accuracy of at least one in $10^7$, to enable accurate measurement.

The use of a laser exhibiting a Zeeman split beam is particularly advantageous due to its characteristic beat frequency, which is easily measurable.

Prior art teachings have shown a number of systems for controlling the frequency stability of an output laser beam. For instance, Lang and Bouwhuis have taught a means of tuning a laser by inducing electro-strictive and thermal changes in the length of the lasing inducing chamber. The lasing chamber length is adjusted to stabilize the median frequency of the laser beam (the median frequency being the average frequency between the Zeeman split component modes) at the known spectral line which is characteristic of the lasing material. Frequency stabilization is accomplished by measuring the intensity difference between the component modes and using the intensity difference measurement to generate a control signal to correct chamber length. The intensities of each of the component modes are alternately measured by an intensity sensitive photodetector. This is accomplished through selective transmittance of each of the component mode beams through an electro-optical crystal whose birefringence is modulated by an a.c. signal to alternately pass one or the other of the component frequencies for intensity measurement by the photodetector. This results in an alternating signal which is compared with the a.c. signal applied to a crystal to obtain a measurement of the difference in intensity of each of the component modes. A control signal is generated responsive to the intensity difference, which controls voltage applied to the chamber length tuning elements of the laser.

The chamber length is adjusted to equalize the intensities of the component modes, thus positioning each of the component modes symmetrically about the line center of the spectral profile, as discussed earlier. This also obtains a minimum frequency difference $\Delta V$ between component modes.

U.S. Pat. No. 3,534,292 of Cutler discloses in a system for modulating the length of the lasing chamber, through use of a piezoelectric element, to produce a frequency difference $\Delta V$ between component modes which is continually modulated. A signal representing the modulated frequency difference is supplied to a frequency discriminator which converts the signal to one having an a.c. and d.c. component. The a.c. component is used to control the range of modulation of the lasing chamber, and thus $\Delta V$ through use of a phase shift circuit. The a.c. component is detected to provide an error correction signal coupled to the piezoelectric element to stabilize the laser component frequencies about the line center of the spectral profile of the lasing medium. The frequency difference between component modes is controlled by a differential amplifier which references a d.c. reference voltage supplied to a differential amplifier which generates a signal to control the strength of the magnetic field applied to the lasing chamber.

Morris and Ferguson have discussed a method of frequency stabilization for a laser influenced by a magnetic field, which consists of heterodyning the component mode frequencies and feeding the heterodyne signal to a comparator to obtain a frequency-to-voltage conversion signal which is applied to an integrator. The signal received from the integrator determines a load to be applied to a heating element wound around the laser cavity wall which introduces a thermal adjustment to the wall of the lasing chamber. This system is used to control the position of the component mode frequencies within the spectral profile.

Hall in U.S. patent application Ser. No. 300,363 filed Sept. 1981 teaches a method of stabilizing the frequency of a laser which comprises obtaining an error signal through dithering (frequency modulating) the Zeeman split component modes within the spectral range and measuring the difference caused in the component mode frequencies by each dither. An up-down counting technique is used to measure change in frequency responding to each direction of the dither, which measurements are compared to determine equal change. Laser cavity length is adjusted to obtain a minimum frequency change of the component modes throughout the dither cycle. Obtaining an equal frequency difference centrally positions the component modes symmetrically about the line center of the spectral profile due to the parabolic function of frequency difference change relative to Doppler expanded spectral profile. The laser cavity length is servo controlled to maintain the frequency difference between component modes at a minimum value by continually applying the dither and counting the relative change in frequency difference between component modes in each direction of its cycle. The counts are maintained equal and opposite in sign.

The Hewlett-Packard Company, Inc. manufactures a gas laser utilizing the Zeeman effect to obtain two component frequencies, which is identified as Model 5525A. By a method similar to that of Lang and Bouwhis the laser is tuned to the line center of the spectral profile through control of a piezoelectric wafer which forms part of the wall of the laser cavity. The piezoelectric element is controlled by an electronic servo loop. The control loop obtains measurement of the intensities of each of the output frequencies of the component modes separately and compares them to drive the servo to maintain the intensities equal through adjustment to the length of the laser cavity. Equating intensities centers the component frequencies about the line center of the spectral profile. Thus, the frequency of each of the Zeeman split component modes is controlled to closely approach the frequency of the line center of the lasing material spectrum profile and the frequency difference is maintained at a minimum to allow accurate prediction of the frequency difference.

Each of the described means and methods of stabilizing the frequency of a Zeeman influenced laser beam has failed to provide an accurate control of the difference in frequency $\Delta V$ between component modes, or, in other words, the beat signal exhibited by their heterodyne mixing. This is a highly important parameter in obtaining an accurate inferometric system which uses the beat frequency as representative of a standard unit of measure. The Lang and Bouwhis, and Hewlett-Packard, stabilization systems adjust the component mode frequencies symmetrically about the line center of the spectral profile, to a point where the difference frequency between the component modes is at a minimum and most predictable. In these methods it is the frequency of the component modes which is controlled within the spectral profile to obtain a predictable difference frequency between them. This is accomplished by a measurement function (i.e., of intensity) for each of the component modes which introduces a third tier of error possibility in the control system. The measurements, and companion operations require more complicated circuitry for the control system. Since the actual value of the difference in frequency is not controlled, the frequency difference may not be held constant and may change from one laser to the next in a production run. Furthermore, the value of the frequency difference may be perturbed by external magnetic fields even though the component mode frequencies are being controlled, resulting in different frequency differences in different environments.

Nor is the frequency difference $\Delta V$ directly controlled by Hall or Cutler. The method described by Hall sought to minimize the frequency difference between component modes. The dither or frequency modulation technique used to obtain a measurement of the frequency difference and determine when a minimum is reached requires a complicated and expensive servo system. Furthermore, the dithers from an optimum position constantly cause a slight change in frequency difference, which derogatorily affects stability. Also, the necessity of performing a dither lowers frequency response. The continual modulation of the length of the lasing chamber and thus the difference frequency taught by Cutler clearly affects the ability of the servo system to accurately stabilize the frequency difference. This technique approximates that of Hall in applying a dither to continually change the frequencies to obtain a comparison value indicative of a minimum frequency difference. The reference signals provided in Cutler do no more determine median values for the loads applied to the length adjusting elements and the magnetic field coil.

The Morris and Ferguson system admittedly has an observed frequency difference variation of 200 Hz which clearly indicates that the ability of the system to control the frequency difference is limited. Furthermore, there is no indication given as to what the heterodyned beat signal is compared with to obtain a frequency-to-voltage conversion. It would seem that the teaching presented merely indicates that the frequency difference signal can be integrated to obtain a control signal adapted to tune the length of the lasing chamber, which is clearly known in the art.

Each of the above-referenced teachings has obtained control of the frequency difference between component modes of a Zeeman split laser by indirect techniques which position the individual component mode frequencies symmetrically within the Doppler expanded profile of the spectral line of the lasing material, to obtain a predictable value. A clear need remains for a stabilization control which can accurately and directly determine the frequency difference, or beat signal, produced by a laser influenced by a magnetic field. Accuracy in stabilizing the frequency difference is clearly advantageous in interferometric techniques for measurement where the frequency difference or beat signal supplies the basic unit, a wavelength of the laser beam, used for measurement.

DISCLOSURE OF THE INVENTION

The present invention comprises a method and means for stabilizing a heterodyned beat signal produced from the output beam of a gas laser influenced by Zeeman effect splitting of the laser beam into component modes. Stabilization is obtained by accurately controlling the difference in frequency between the component modes to provide a selected separation, preferably 250 KHz, with deviation maintained to less than one KHz wander. The difference in frequencies is controlled independently of the individual frequency or intensity of either of the component modes, or their relative position within the "Doppler expanded" spectral profile characteristic of the lasing material.

A servo control loop is provided which drives a piezoelectric element and a thermal element for tuning the length of the lasing chamber of the laser, to accurately control the frequency difference between the component mode frequencies. The servo loop contains a frequency synthesizer or other reference clock source which generates a reference signal characteristic of the beat signal frequency. The reference signal is phase locked to the heterodyned beat signal for direct control and absolute stability of the output laser beam.

The reference signal can possess any number of harmonic frequencies of a desired beat signal to provide a highly accurate division of the light wavelength which is used as the standard unit of measurement in an interferometric system. Since the reference signal is phase locked to the beat signal, harmonic divisions are a highly accurate means of providing increased resolution in interferometric measurement techniques.

The reference signal is generated with a crystal oscillator which provides an accurate and stable signal to which the beat signal is phase locked. This substantially reduces phase jitter and frequency difference wander to a fraction of one wavelength of the laser beam. This accuracy substantially reduces error in measurement for which the wavelength, or beat signal, is used as a standard unit.

The present invention provides a simple and low-cost servo control which accurately controls the frequency difference $\Delta f$ between component modes in a Zeeman split laser, thus fulfilling a vital need remaining in view of prior means and methods for stabilization of laser output frequency. It furthermore provides a reference signal which, in addition to providing control of the frequency difference between component modes, provides a highly accurate reference signal representative of the light wavelength, i.e., standard unit of measurement. This enables great flexibility in synchronizing external events to the heterodyned beat signal used in interferometric techniques, and provides a basis for processing the results obtained from operation of an interferometric system. The difference frequencies of the output beam produced by the laser is actively controlled and maintained at the same value irrespective of outside environmental influence, minor differences between laser assemblies, or changes in the magnetic environment of the laser.

BEST MODE OF THE INVENTION

Figure 3:
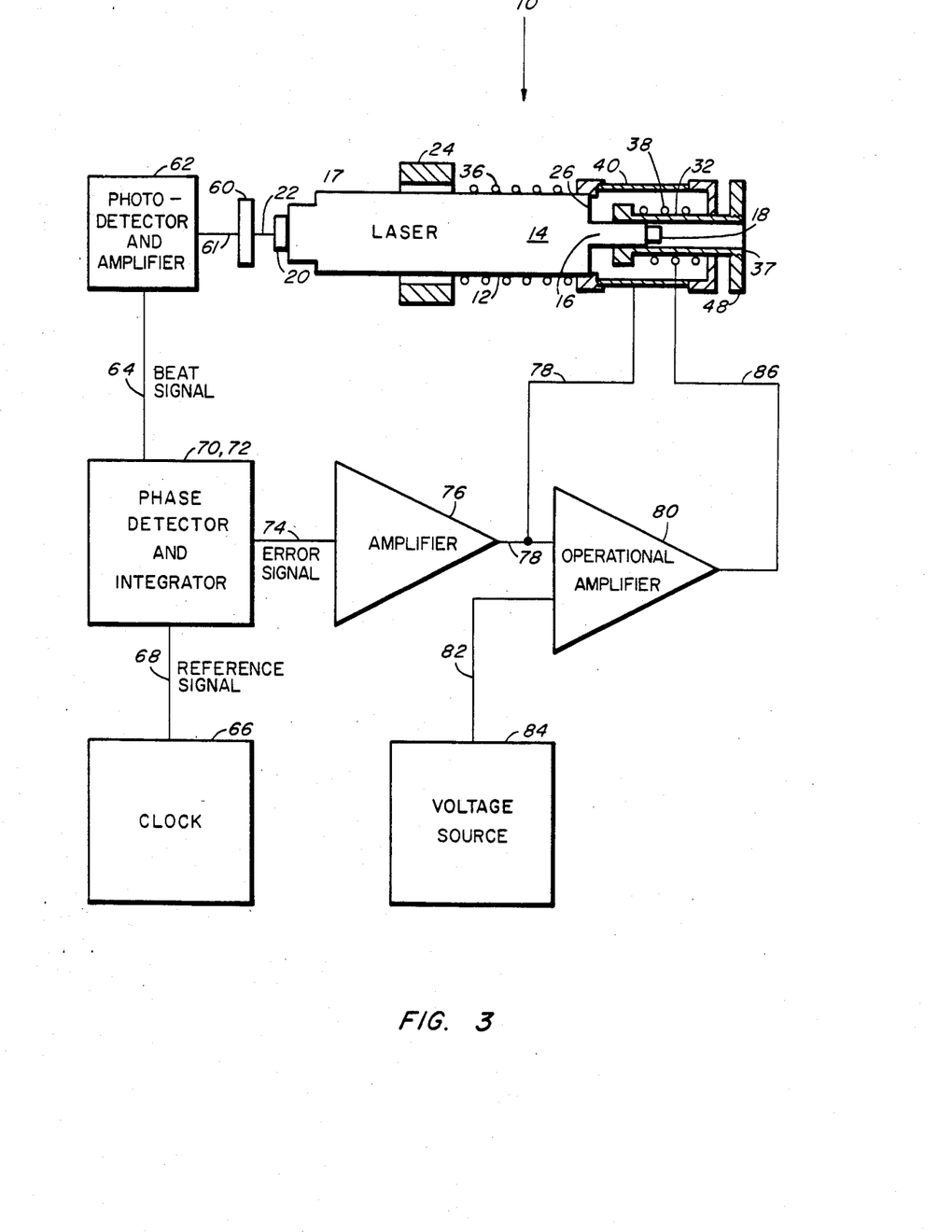
FIG. 3 is a schematic representation of the closed loop servo control for controlling frequency stability of a Zeeman affected gas laser.

This invention comprises a closed loop servo control system, schematically depicted in FIG. 3, for directly controlling the difference in frequencies $\Delta f$ of the component modes of a laser beam influenced by a magnetic field to exhibit Zeeman splitting phenomenon. The laser structure 10 comprises a tubular wall 12 which defines an internal chamber 14 in which the lasing material is encapsulated. At a forward section 16 of the chamber 14, a semi-transparent reflector 18 is positioned to partially pass and to partially reflect the electromagnetic waves emitted by the excited lasing material. At the opposing end 17 of the laser, a second reflector 20 is positioned which is provided with a small window (not shown) to pass a secondary laser beam 22 for control purposes.

The lasing material in the chamber 14 is excited to a high energy state by electrical discharge, to obtain a simulated emission of electromagnetic energy, i.e., a laser beam. The length of the chamber 14, or more specifically, the distance between the reflectors 18 and 20 is made equal to an integral multiple of the generated wavelength of light. This provides optical resonance of the electromagnetic waves generated within the chamber. The chamber length may be tuned within a narrow range to selectively position the light wavelength within the "Doppler expanded" spectral profile of the lasing material, as discussed previously.

The lasing material contained in the chamber 14 is preferably an isotropic mixture of naturally occurring Neon at 0.35 for partial pressure, and $He_3$ helium at 3.75 for partial pressure. A laser containing a preferred lasing material is available from the Aerotech Corporation as Model LT05R.

A magnet 24 is positioned concentrically around the tubular wall 12 of the laser 10, to apply an axial magnetic field to the excited lasing material within the chamber 14. The magnetic field influences the atoms of the lasing material to produce a Zeeman effect, which results in splitting of the beam emitted from the laser into two component modes. Each of the component modes is circularly polarized in opposing direction and their respective frequencies differ by a small amount, as has been discussed. The individual frequencies of the component modes and the difference in frequency between them, can be changed by changes in the distance between the reflectors 18 and 20. Thus by providing a means for axially moving one of the reflectors 18 or 20 relative to the chamber 14, to adjust the distance between the reflecting surfaces, the frequency difference between component modes of the laser output can be tuned to a desired value. This value has been previously defined as the Zeeman beat frequency.

An ability to tune the chamber length of the present laser is provided by a diaphragm 26 forming one end of the chamber 14. This diaphragm 26 permits the reflector 18 to be moved a small distance along the lateral axis of the laser, thereby adjusting the distance between the reflectors 18 and 20 at opposing ends of the chamber 14. The diaphragm additionally provides axial support to maintain the reflectors 18 and 20 parallel to one another.

Figure 4:
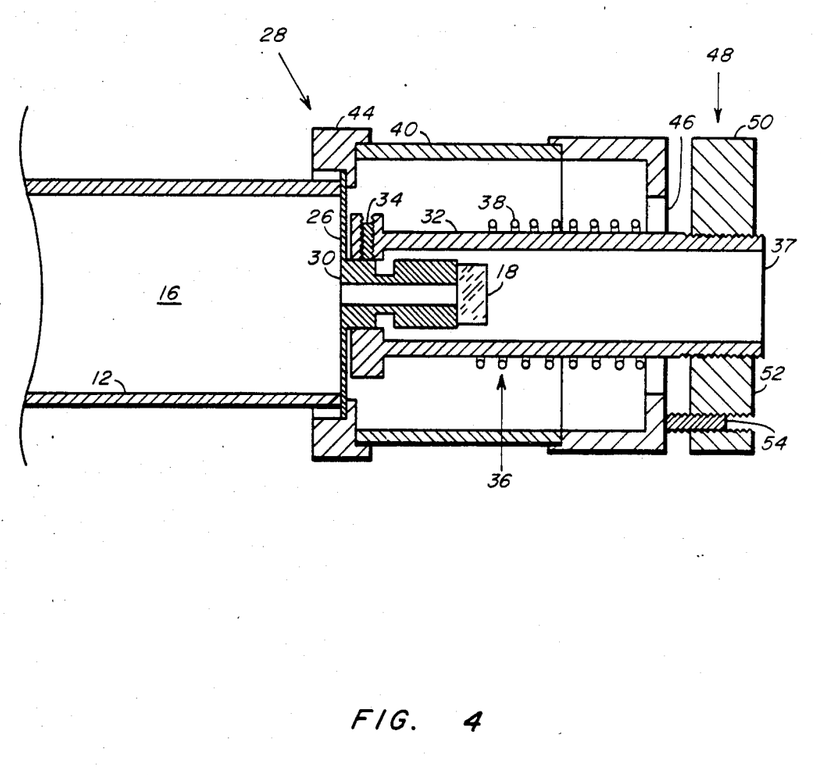
FIG. 4 is a cross-section of a piezoelectric length adjustment element.

Movement of the reflector 18 by deformation of the diaphragm 26 is controlled by the apparatus shown in FIG. 4. A sealing ring 28 is circumferentially mounted to the end 16 of the tubular wall 12 defining the lasing chamber 14. A tubular extension element 30 is concentrically mounted to the central portion of the diaphragm 26 and extends outwardly from the lasing chamber 14 to carry the reflector 18 through which the main laser beam is passed from the lasing chamber. A tube is mounted to and surrounds the tubular extension element 30. The tube 32 is held in position by set screw 34 which engages the exterior surface of tubular extension element 30. The tube 32 extends outwardly from chamber 14 a greater distance than extension element 30. The tube 32 is hollow to provide an exit path for the laser beam from the semi-transparent reflector 18.

A piezoelectric transducer 40, having a cylindrical shape, is positioned against the seating ring 28 at one end and fits into an end cap 42 at its opposing end. The piezoelectric transducer 40 is captured between the seating ring 28 and the end cap 42 by circumferentially formed shoulders 44 and 45 on each of the ring 28 and the end cap 42, respectively.

A bore 46 centrally formed through the end cap 42, provides an opening through which the tube 32 protrudes. The end cap 42 is preferably made of a material having a low coefficient of thermal expansion, such as stainless steel, so as not to be affected by the heat.

The outward end 37 of the tube 32 is threaded to receive an adjustment nut 48. Adjustment nut 48 provides an inwardly directed surface 50 mounted with the outward end 37 of the tube 32, which is adjustable relative to the outward surface of the end cap 42. A plurality of small threaded bores (one shown) are formed through an outward portion of the adjustment nut 48. Set screws 54 are threaded through the threaded bores to engage the outward surface of the end cap 42.

In assembly, the tube 32 mounted to the diaphragm 26 through the tubular extension 30, engages the surface of the end cap 42 through the adjusting nut 48 and set screws 54. The surface of end cap 42 is located by piezoelectric element 40 relative to the end 16 of the lasing chamber 14. Thus a longitudinal movement of the piezoelectric element 42 will cause a flexure of the diaphragm 26 and an axial change in the distance between reflectors 18 and 20 described as follows.

The apparatus of FIG. 4 is assembled as shown. The set screws 54 are tightened so that tube 32 is pulled away from the laser 10. This causes extension element 30 to move axially away from the chamber 14, flexing the diaphragm 26 to increase the distance between reflectors 18 and 20.

The adjustment nut 48 threaded to the outward end 37 of the tube 32 provides a means for adjusting the nominal distance between reflectors 18 and 22 when the servo control system is inoperative. The distance between the reflectors 18 and 20 may be finely tuned by rotating adjusting nut 48.

The piezoelectric transducer 40 exhibits a short range of linear movement along its cylindrical axis in response to a voltage signal. Increase in voltage of an applied signal causes the piezoelectric transducer to contract in length. The movement characteristics of the piezoelectric transducer are generally linearly responsive with its voltage range. A Model 16-16063-5H manufactured by Vernitron Corp., is used by Applicant.

In operation a change in the voltage signal supplied to the piezoelectric element 40 will result in a characteristic expansion or contraction, which will move the end cap 42 relative to the end of the lasing chamber 14. When voltage is applied to the piezoelectric element 40 to obtain a contraction in length, the cap 42 will be moved closer to the seating ring 28, and thus toward the lasing chamber 14. This movement will be translated to the adjustment nut 48 threaded to the end of the tube 32 and through tube 32 to move the diaphragm 26, and reflector 18. It is well known that the piezoelectric element rapidly changes length in response to a change in voltage signal supplied to it, though it has a limited range through which its length may be changed. It is thus a fast reacting micro-range distance adjusting element for reflectors 18 and 20.

An increase in voltage of the signal supplied to the piezoelectric element 40 normally produces a contraction in length from its non-energized state. It is thus desirable to supply a base line voltage signal to piezoelectric element 40 which obtains contraction of the element to a median position within is movable range. In this condition an increase or decrease voltage change may be applied to obtain either expansion or contraction of length, as may be required for tuning the length of chamber 14.

A heating element 36 is wound around the circumference of a central portion of the laser body 12. When a current signal is applied to the heating element 36 surrounding the laser wall 12, the heat energy generated will increase the laser wall 12 in length. The expansion or contraction of the laser wall 12 in response to a change in current will move the reflectors 18 and 20 apart.

The thermal expansion of the laser wall 12 will generally provide a large range of movement, though it more slowly responds to a change of current in the applied signal due to inherent time lag in the heating element and heat transfer to its surface. The heating element 36 thus acts as a slow reacting macro-range distance adjusting element for reflectors 18 and 20.

It can thus be appreciated that the piezoelectric transducer 40 and the heating element 36 cooperate to adjust the length of the lasing chamber, and thus the difference in frequency of the component modes. The piezoelectric transducer reacts quickly and maintains an extremely tight control of the chamber length in a limited range and the heating element 36 produces large changes required in the length of the laser chamber 14.

With the described apparatus for chamber length adjustment, a closed loop servo control, schematically depicted in FIG. 3, is employed to drive the signal responsive length adjustment elements 36 and 40. The laser beam 22 passing through the small window of reflector 20 is directed through a polarizer 60. The polarizer 60 reduces the intensity of each of the circularly polarized component modes and linearly polarizes a portion of each component mode in a unidirectional plane. The beam components interfere to produce a resultant wave 61 displaying a cyclic the beat phenomenon. The amplitude of the resultant wave 61 varies with time periodically with a characteristic beat, measured as the frequency of maximum amplitude events. (The resultant wave has a frequency determined as an average of the frequency of the two component mode waves.) The periodic variation in amplitude, or beat frequency, equals the difference of the frequencies of the individual component mode waves. Thus the beat frequency is a clear indicator of the frequency difference found between the Zeeman shifted component modes of the laser beam. This phenomenon is described in articles entitled Interferometric Measurement of Length and Distance, by W. R. C. Rawley (1972 Alta Frequenta v. 41); Zeeman Effects in an He—Ne Laser, by P. T. Baldwijn (Physics and Quantum Electronics, p. 620, McGraw-Hill Book Co.), Derivation of Frequency-Sensitive Signal from a Gas Laser in an Axial Magnetic Field, by Irwin Tobias (Applied Physics letters, Vol. 6, p. 10) and Physics Treatise by Resnick and Halliday (Wiley Publishing Co.).

The resultant light wave 61 is applied to a photodetector and amplifier 62 which generates a electrical signal 64 having a heterodyned characteristic beat frequency which corresponds in frequency to the beat displayed by the interfering component modes in resultant waves 61. This signal will be referred to herein as the beat signal 64.

The photodetector and amplifier 62 are commonly known and used elements, available from many manufacturers.

An independent reference clock 66, consisting of a crystal oscillator producing a clock pulse signal and a frequency divider (i.e., a divider by N type counter), supplies a reference signal 68 of 250 KHz. These elements are also commonly known and used elements, available from many manufacturers. The reference signal 68 is selected to be 250 KHz in view of extensive research performed by Applicant on numerous commercially available lasers. The results of this research have indicated that a 250 KHz signal possesses a desirable frequency which is easily obtainable from available signal oscillators and which is a median frequency characteristic of the frequency difference of component modes, exhibited by most of the lasers tested when influenced by an axial magnetic field.

The reference signal 68 and the beat signal 64 are applied to a phase detector 70. The phase detector 70 generates an output signal which is proportional to the difference in phase between the beat signal 64 and the reference signal 68.

The phase detector 70 is a commercially available model manufactured by the Motorola Corp. under Part No. 14046B. More information is available regarding phase detector 70 and its output signal in the CMOS Data Book by Motorola on p. 7-124.

The output signal of the phase detector 70 is a voltage signal which varies in time in proportion to the phase difference between the applied input signals 64 and 68. The output signal of phase detector 70 indicates the phase correction required to bring applied signals 64 and 68 into phase. Since this is accomplished by adjusting the frequency of beat signal 64 through length adjustments to the laser chamber 14, the output signal of phase detector 70 is directly related to the change required in chamber length. It is thus an instantaneous length correction signal which can be applied over time to the length adjustment elements 36 and 40 to bring the signals 64 and 68 into phase, stabilizing the beat signal 64 at a constant frequency equal to signal 68.

The output signal of the phase detector 70 is integrated with respect to time by an integrator 72 which effectively sums signal changes provided by the phase detector 70. The integrator 72 produces an error signal 74 having a voltage which represents the change in distance that is required between the reflectors mounted at the ends of the laser chamber 14, to bring the beat signal 64 and the reference signal 68 into phase. Integrator circuits applicable to this invention are also discussed in the referenced Motorola CMOS Data Book. The error signal 74 is amplified by an amplifier 76 and the amplified error signal 78 applied directly to the piezoelectric transducer 40 to obtain immediate correction, within the range of the piezo electric transducer, of the distance between the reflectors 18 and 20 in the chamber 14. The instantaneous adjustment of reflector separation provides fine control which allows the servo control to lock the beat signal 64 and the reference signal 68 in phase and provide direct control of the difference in frequency between component modes, and thus the frequency of the Zeeman beat signal of the component modes of the laser beam.

The amplified error signal 78 is also applied to an operational amplifier 80. The operational amplifier 80 acts as a differential amplifier compares the amplified error signal 78 with a reference voltage signal 82 which is generated by a reference voltage source 84. The reference voltage signal 82 is selected as a voltage which drives the piezoelectric element 40 to the median point of its range of movement so that, when the distance between the reflectors 18 and 20 in the lasing chamber is stabilized, the piezoelectric element 40 will be at a mediah point to adequately provide instantaneous bidirectional adjustment of the reflector separation distance. The operational amplifier circuit and operation is described in many reference materials, for example, Analog and Digital Electronics by Vassos and Ewing (John Wiley & Sons, N.Y., N.Y.) and Analysis and Design of Digital Circuits by Chirlian (Matrix publishers, Champ, Ill.)

If the operational amplifier 80 receives an error signal 78 which has a lower voltage than the reference voltage 82 (expanding piezoelectric transducer 40), the amplifier 80 will decrease current flow 86 to the heating element 36 which heats the laser 16 to contract the laser body and allow transducer 40 to contract to mid-range. If the operational amplifier receives an error signal 78 having a voltage greater than the reference voltage 82 (contracting piezoelectric transducer 40), the amplifier 80 will increase current 86 to heating element 36 to increase heat applied, expanding the laser 16 to allow transducer 40 to expand. Thus, with a reference voltage 82 selected to bring piezoelectric element 40 to a median point in its range of travel, the laser length will be driven to bring the piezoelectric element into its midpoint operating range, to perform macro adjustments to the laser chamber length, while the piezoelectric element 40 provides micro-adjustment to chamber length within its limited range of movement.

Once the servo control system reaches stability with the error signal 74 unchanging because the phase of signal 64 has been tuned to the phase of signal 68, the phase detector 70 will phase lock the beat signal 64 with the clock reference signal 68 since any infinitely small variation in phase will trigger the phase detector 70 to generate an error signal 74, causing the piezoelectric element 40 to immediately react correctively. The beat signal 64 thus stabilized, indicates that the difference in frequency of the combined component modes of the laser beam, is also stabilized, at a fixed value of 250 KHz (or a simple multiple of the 250 KHz reference signal).

What is claimed:

1. A closed loop feedback control for a laser having an excited lasing material contained within an adjustable length chamber producing a laser beam, and influenced by a magnetic field to obtain two component modes of differing frequency in said laser beam, said feedback control controls the frequency difference between said component modes comprising:

a first means for heterodyne mixing said component modes to obtain an electrical signal characterized by a beat frequency generated by mixing the frequencies of said component modes and representing the difference in frequency between the component modes;

a second means for producing a reference signal having a frequency characteristic of a desired beat frequency signal;

a third means, receiving said electrical signal from said first means and said reference signal from said second means, for comparing the phase between said electrical signal and said reference signal to determine a difference in Phase, and producing an error signal responsive to the difference in phase between said signals with respect to time; and control means responsive to said error signal for changing the length of said laser chamber to obtain a controlled frequency difference between said component modes in said laser beam, which component modes produce when heterodyned by said first means an electrical a beat signal having a frequency which is locked in phase with the frequency of said reference signal to determine said frequency difference between component modes; whereby said beat signal becomes phase locked to said reference signal to determine said frequency difference between the component modes.

2. The feedback control of claim 1 wherein said first means comprises a polarizer for receiving said laser beam and interfering common linearly polarized components of said component modes, to produce a heterodyned light beam having a beat frequency representing the difference in frequency between said component modes, and a photodetector for receiving said heterodyned beam to generate an electrical signal representing said heterodyned light beam.

3. The feedback control of claim 1 wherein said third means comprises a phase detector and an integrator, which generate an error signal proportional to the integral of differences in phase between said beat signal and said reference signal.

4. The feedback control of claim 1 wherein said control means responsive to said error signal comprises:

a first means for adjusting length of said chamber which quickly changes chamber length over a limited distal range; and a second means for adjusting chamber length over a wide distal range;

said first and second means cooperating to adjust said chamber length and maintain said first means in a median portion of its distal range.

5. The feedback control of claim 1 wherein said control means responsive to said error signal comprises a piezoelectric transducer responsive to said error signal, an operational amplifier responsive to said error signal for producing an output current signal, and a thermally expandable element responsive to said current signal, which change the length of said laser chamber in response to changes in said error signal.

6. A closed loop servo control system for tuning the length of a leasing chamber to control the difference in frequency between two component modes of a Zeeman split laser beam comprising:

a reference clock producing a constant frequency reference signal;

means for generating a hetrodyne beat signal, having a beat pulse frequency equalling the difference in frequency of said component modes;

a phase detector receiving said reference signal and said beat signal, said detector producing an output signal having a voltage proportional to the phase difference between said reference and said beat signals;

an integrator receiving said phase detector output signal, for summing said output signals of said phase detector and producing a signed error signal proportional to the integrated phase difference of said reference and beat signals, the sign of said error signal indicating a lead or lag in phase of said beat signal relative to said reference signal;

a first means for changing said laser chamber length, said means responsive to said error signal voltage within a limited range for fast micro adjustments to said length of said lasing chamber;

reference voltage source producing a reference voltage signal equal to the voltage required by said first means to obtain a medium position in said limited movement range;

an operational amplifier receiving said error signal and said reference voltage signal, said amplifier producing a current signal responsive to a difference in said error signal and said reference voltage signal;

a second means for controlling said lasing chamber length, said means responsive to said current signal for macro adjustments to said length of said lasing chamber.

7. A servo control system for tuning a magnetically influenced split laser to generate component modes of a laser beam having a constant difference in frequency comprising:

clock means for generating a reference clock signal;

means for heterodyning said component modes of said laser beam to obtain a beat signal;

sensor means for comparing the phase relationship of said reference signal and said beat signal, and generating an error signal;

tuning means for controlling the frequency difference of said component modes of said laser output beam in response to said error signal; and control means for synchronizing the phase of said beat signal with said reference signal to determine the difference in frequency between said component modes.

8. A method of stabilizing the difference in frequencies of the component modes of a laser beam generated in an adjustable lasing chamber influenced by a magnetic field to obtain Zeeman splitting, comprising, heterodyne mixing the component modes of said beam to obtain an electromagnetic heterodyne wave having a beat frequency equal to said difference in component mode frequencies;

generating an electrical signal having a beat frequency equivalent to the beat frequency of said heterodyned wave;

comparing the phase between said electrical signal and a reference signal having a selected frequency characteristic of the desired beat frequency, to determine a difference in phase;

adjusting said lasing chamber length in response to the difference in phase between the heterodyned signal and the reference signal, to bring the signals into phase;

maintaining said heterodyned signal and said reference signal locked in phase by instantaneous adjustment in the length of said lasing chamber.

9. A phase lock servo control loop for controlling the difference in frequency between component modes of a Zeeman split laser beam comprising:

means for generating a heterodyne signal having a beat frequency equal to the difference in component mode frequencies;

a reference clock for generating a constant frequency signal, said frequency equalling the desired frequency of the beat in said heterodyned signal;

a phase comparator for comparing the phase of said heterodyne signal and said reference signal, and generating a phase difference signal proportional to the phase difference in said signals;

an integrator for summing incremental changes in said phase difference signal, and generating an error signal proportional to the summation of changes;

means for controlling the difference in frequency between the two component modes responsive to said error signal.

* * * * *

UNITED STATES PATENT AND TRADEMARK OFFICE
CERTIFICATE OF CORRECTION

PATENT NO. : 4,672,618

DATED : June 9, 1987

INVENTOR(S) : Geert Wijntjes and Michael Hercher

It is certified that error appears in the above-identified patent and that said Letters Patent is hereby corrected as shown below:

Column 13, line 14   "medium" should be deleted and --median-- should be inserted Column 14, line 39   "two" should be deleted Signed and Sealed this Seventeenth Day of May, 1988

Attest:

DONALD J. QUIGG

Attesting Officer   Commissioner of Patents and Trademarks